(12) United States Patent
Wilson et al.

(10) Patent No.: US 9,534,709 B2
(45) Date of Patent: Jan. 3, 2017

(54) PLUMBING BRACKET ASSEMBLY

(71) Applicant: ERICO International Corporation, Solon, OH (US)

(72) Inventors: Jeffrey A. Wilson, Cuyahoga Falls, OH (US); Eric C. Osborn, Medina, OH (US); Nicholas J. Ambrogio, Highland Heights, OH (US); Eric J. Wilson, Solon, OH (US)

(73) Assignee: ERICO INTERNATIONAL CORPORATION, Solon, OH (US)

( * ) Notice: Subject to any disclaimer, the term of this patent is extended or adjusted under 35 U.S.C. 154(b) by 0 days.

(21) Appl. No.: 14/551,472

(22) Filed: Nov. 24, 2014

(65) Prior Publication Data

US 2015/0159781 A1 Jun. 11, 2015

Related U.S. Application Data

(60) Provisional application No. 61/912,143, filed on Dec. 5, 2013.

(51) Int. Cl.
*F16L 3/00* (2006.01)
*F16L 3/10* (2006.01)
(Continued)

(52) U.S. Cl.
CPC ............... *F16L 3/227* (2013.01); *E21F 17/02* (2013.01); *F16L 3/08* (2013.01); *F16L 3/105* (2013.01);
(Continued)

(58) Field of Classification Search
CPC ............... F16L 3/22; F16L 3/08; F16L 3/105; F16L 3/1091; F16L 3/1058; F16L 3/00; E21F 17/02
(Continued)

(56) References Cited

U.S. PATENT DOCUMENTS 3,718,307 A * 2/1973 Albanese ........................ 248/57
3,944,175 A * 3/1976 Kearney ......................... 248/59
(Continued)

FOREIGN PATENT DOCUMENTS

JP 2004324807 11/2004

OTHER PUBLICATIONS

"Telescopic Screw Gun Bracket", Erico Caddy, Copyright 2008, 2 pgs.
(Continued)

*Primary Examiner* — Tan Le
(74) *Attorney, Agent, or Firm* — Quarles & Brady LLP

(57) ABSTRACT

A plumbing bracket assembly has a plastic main bracket body and a telescoping bracket. The telescoping bracket runs through the main bracket body, and is able to extend to allow the bracket assembly to be secured to structure (such as studs) at both ends, over a range of distances between structure elements. The bracket body is initially able to slide along the telescoping bracket, for desired positioning, but may be locked in place using screws on the main bracket body. Hardware, such a hose clamp and multiple pipe clamps, is initially coupled to the main bracket body. The main bracket body may have a central depression for receiving a relatively large pipe run, and notches or depressions on opposite sides of the central depression, for receiving smaller pipe runs.

15 Claims, 3 Drawing Sheets

(51) Int. Cl.
*E21F 17/02* (2006.01)
*F16L 3/227* (2006.01)
*F16L 3/08* (2006.01)
*F16L 3/22* (2006.01)

(52) U.S. Cl.
CPC ............. *F16L 3/1058* (2013.01); *F16L 3/1091* (2013.01); *F16L 3/22* (2013.01); *Y10T 29/4995* (2015.01)

(58) Field of Classification Search
USPC ............... 248/58, 62, 65, 68.1, 70, 73, 74.1, 74.3,248/200.1, 298.1; 24/271, 272
See application file for complete search history.

(56) References Cited

U.S. PATENT DOCUMENTS

| | | | |
|---|---|---|---|
| 5,303,887 A * | 4/1994 | Hasty et al. | 248/68.1 |
| 5,593,115 A | 1/1997 | Lewis | |
| 5,725,185 A | 3/1998 | Auclair | |
| 5,833,179 A * | 11/1998 | VandenBerg | 248/65 |
| 5,876,000 A * | 3/1999 | Ismert | 248/65 |
| 5,931,423 A | 8/1999 | Heideloff | |
| 5,971,329 A | 10/1999 | Hickey | |
| 6,158,066 A | 12/2000 | Brown et al. | |
| 6,375,128 B1 | 4/2002 | Condon et al. | |
| 6,402,096 B1 * | 6/2002 | Ismert et al. | 248/68.1 |
| 6,446,915 B1 * | 9/2002 | Ismert | F16L 3/221 248/68.1 |
| 7,039,965 B1 * | 5/2006 | Ismert | 4/695 |
| 7,223,052 B1 * | 5/2007 | Evans | F16L 1/10 248/216.1 |
| 7,381,893 B2 * | 6/2008 | Kerr, Jr. | H02G 3/125 174/50 |
| 2008/0191102 A1 | 8/2008 | Condon et al. | |
| 2013/0104494 A1 * | 5/2013 | Evangelista | H02G 3/125 52/741.1 |

OTHER PUBLICATIONS

International Search Report and Written Opinion from corresponding international application PCT/US2014/067051, mailed Mar. 12, 2015.

* cited by examiner

PLUMBING BRACKET ASSEMBLY

This application claims priority under 35 USC 119 to U.S. Provisional Application 61/912,143, filed Dec. 5, 2013, the entirety of which is incorporated by reference herein.

BACKGROUND OF THE INVENTION

Technical Field of the Invention

The invention is in the field of brackets and assemblies for plumbing installations.

Description of the Related Art

In making plumbing installations, waste pipes and supply pipes are often pre-fabbed or pre-assembled off-site, and then are installed together on a jobsite. Currently, contractors use inexpensive brackets to do this pre-fab work. Assemblies are fabricated in a shop, and then are shipped to a jobsite, where installers lift them into the stud wall and attach a mid-span support from the studs to the pipes. This method has been found to be the standard in many pre-fab shops throughout the country. There are many shortcomings in common products and methods for accomplishing. Among these are problems with a plastic bracket that comes in loose pieces and is time consuming to assemble, and that such a plastic bracket breaks easily when installing the supply line clamps over the pipes, and during the transport of the pre-fab assemblies to the job site.

Telescoping brackets are sometimes used that offer a mid-span support, but are sold separate from the clamps. These telescoping brackets also do not clamp the waste line.

Certain copper-plated steel brackets are time consuming to sweat/solder onto copper pipes. The brackets must also be separately attached to the waste pipes, perhaps with separate loose pieces.

In all of the above prior approaches, the contractor still needs to install a separate mid-span support from the pipes to the wall. This is generally fully done during installation, which can result in higher costs.

It would be advantageous to reduce the time it takes to pre-fab waste and supply pipes together. It would also be advantageous to reduce the time it takes to install the pre-fabbed sections into the wall cavity.

SUMMARY OF THE INVENTION

According to aspects of the invention, a plumbing bracket assembly includes: a bracket body for supporting multiple pipe runs; and hardware for securing the pipe runs (or other objects) to the bracket body. The bracket assembly may have one or more of the following additional features: the bracket body is made of plastic; the bracket body has V-shape or U-shape pipe-receiving grooves or notches, for receiving pipes of various diameters; the bracket body has a central groove or notch for receiving a relatively large diameter pipe, such as a waste pipe; the bracket body has additional relatively small grooves or notches for receiving relatively small diameter pipes, such as supply pipes; the bracket body has multiple of the relatively small grooves or notches on each side of the central groove or notch, enabling varying of the relative spacing of the pipes secured to the bracket body; the bracket assembly also includes telescoping elements that slide relative to the bracket body; the telescoping elements are made of metal; the telescoping elements are partially within the bracket body; the telescoping elements are slidably coupled with one another; the bracket body can slide independently of the telescoping elements; the telescoping elements extend out of opposite respective ends out the bracket body; the telescoping elements have end sections, outside of the bracket body, for mounting to studs or other structure (or other objects); the end sections are bendable relative to other parts of the telescoping elements; the end sections have holes for receiving fasteners to mount the bracket to a wall, stud, or other structure; fasteners in the bracket body are able to lock the telescoping elements in place relative to the bracket body; the fasteners in the bracket body are locking screws; the fasteners in the bracket body engage any of a line of holes in the telescoping elements; the hardware includes a central clamp; the central clamp is a hose clamp; the central clamp is fits through part of the bracket body; the hardware includes one or more pipe clamps, with associated fasteners; the one or more pipe clamps are secured to the bracket body prior to use; the one or more pipe clamps are secured to the bracket body, prior to use, by being taper locked into the bracket body; the one or more pipe clamps are secured to the bracket using the associated fasteners; and/or the associated fasteners are threaded fasteners that threadedly engage corresponding holes in the bracket body.

According to an aspect of the invention, a plumbing bracket assembly includes: a bracket body for supporting multiple pipe runs; hardware, secure to the bracket body prior to installation of the pipe runs, for securing the pipe runs to the bracket body; and a telescoping bracket mechanically coupled to the bracket body for securing the bracket assembly to external objects.

In an embodiment in combination with one or more other features of one or more other paragraphs of this section, the bracket body is made of plastic.

In an embodiment in combination with one or more other features of one or more other paragraphs of this section, the bracket body has a central groove or notch for receiving a relatively large diameter pipe.

In an embodiment in combination with one or more other features of one or more other paragraphs of this section, the bracket body has additional relatively small grooves or notches for receiving relatively small diameter pipes, such as supply pipes.

In an embodiment in combination with one or more other features of one or more other paragraphs of this section, the bracket body has multiple of the relatively small grooves or notches on each side of the central groove or notch, enabling varying of the relative spacing of the pipes secured to the bracket body.

In an embodiment in combination with one or more other features of one or more other paragraphs of this section, the bracket body is independently slidable along the telescoping bracket.

In an embodiment in combination with one or more other features of one or more other paragraphs of this section, the telescoping bracket includes telescoping elements that slide relative to the bracket body.

In an embodiment in combination with one or more other features of one or more other paragraphs of this section, the telescoping elements are partially within the bracket body, and extend out of opposite respective ends out the bracket body.

In an embodiment in combination with one or more other features of one or more other paragraphs of this section, the telescoping elements are slidably coupled with one another.

In an embodiment in combination with one or more other features of one or more other paragraphs of this section, the telescoping elements have respective end sections, outside of the bracket body, for mounting to studs or other structure.

In an embodiment in combination with one or more other features of one or more other paragraphs of this section, the end sections are bendable relative to other parts of the telescoping elements.

In an embodiment in combination with one or more other features of one or more other paragraphs of this section, the end sections have holes for receiving fasteners to mount the bracket to a wall, stud, or other structure.

In an embodiment in combination with one or more other features of one or more other paragraphs of this section, the bracket assembly further includes fasteners in the bracket body are able to lock the telescoping bracket in place relative to the bracket body.

In an embodiment in combination with one or more other features of one or more other paragraphs of this section, the hardware includes a central hose clamp that fits through part of the bracket body.

In an embodiment in combination with one or more other features of one or more other paragraphs of this section, the hardware includes one or more pipe clamps, with associated fasteners.

In an embodiment in combination with one or more other features of one or more other paragraphs of this section, the one or more pipe clamps are secured to the bracket body, prior to use, by being taper locked into the bracket body.

According to another aspect of the invention, a method of securing pipe runs includes the steps of: securing the pipe runs to a bracket body of a bracket assembly using hardware that is secured to the bracket body prior to the securing of the pipe runs; and after securing the pipe runs to the bracket body, securing the bracket assembly to structure using a telescoping bracket of the bracket assembly, wherein the telescoping bracket is mechanically coupled to the bracket body.

According to yet another aspect of the invention, a plumbing bracket assembly includes: a plastic bracket body for supporting multiple pipe runs; hardware, secure to the bracket body prior to installation of the pipe runs, for securing the pipe runs to the bracket body; and a telescoping bracket, such as a metal telescoping bracket, mechanically coupled to the bracket body for securing the bracket assembly to external objects; wherein the bracket body defines a central depression for receiving a relatively large pipe run, with a hose clamp mechanically coupled to the bracket body to secure the relatively large pipe run in the central depression; wherein the bracket body defines multiple relatively small depressions, smaller than the central depression, on either side of the central depression, for securing relatively small pipe runs; wherein telescoping bracket includes a pair of bracket elements able to slide relative to one another to change a length of the telescoping bracket; wherein the bracket elements include respective bendable portions with fastener holes therein, for securing the bracket assembly to structure; and wherein the hardware includes pipe clamps.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

A plumbing bracket assembly has a plastic main bracket body and a telescoping bracket. The telescoping bracket runs through the main bracket body, and is able to extend to allow the bracket assembly to be secured to structure (such as studs) at both ends, over a range of distances between structure elements. The bracket body is initially able to slide along the telescoping bracket, for desired positioning, but may be locked in place using screws on the main bracket body. Hardware, such a hose clamp and multiple pipe clamps, is initially coupled to the main bracket body. The main bracket body may have a central depression for receiving a relatively large pipe run, and notches or depressions on opposite sides of the central depression, for receiving smaller pipe runs.

Figure 1A:
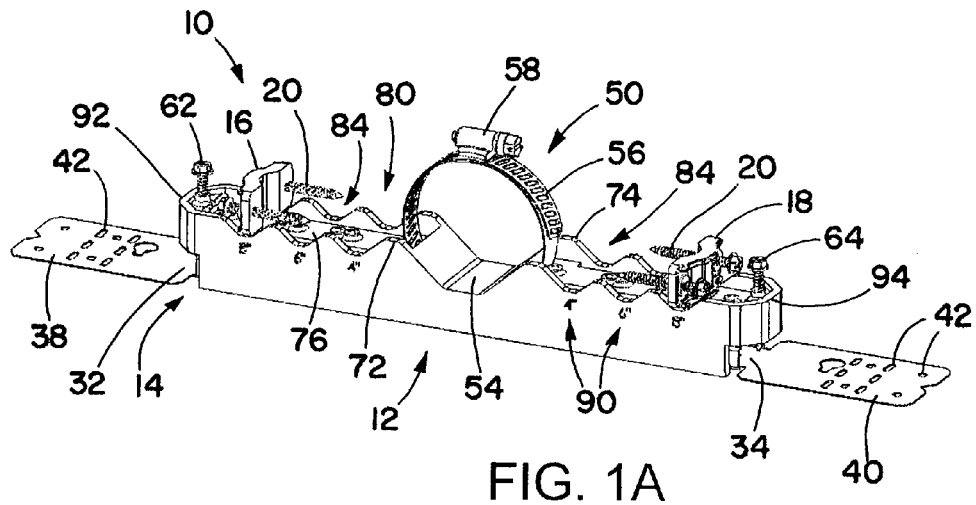
FIG. 1A is an oblique view of a bracket assembly in accordance with an embodiment of the invention.
Figure 1B:
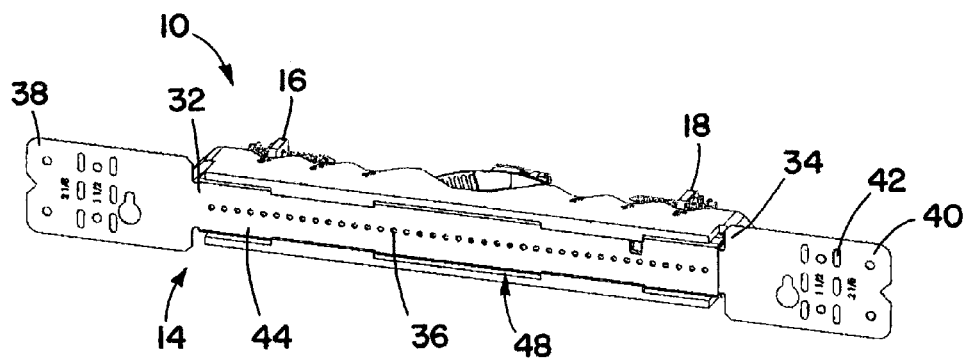
FIG. 1B is an oblique view showing the back of the bracket assembly of FIG. 1A.

Referring initially to FIGS. 1A and 1B, a plumbing bracket assembly 10 is used to quickly fix pipe runs, for example supply pipes to a waste pipe, and then attach that assembly into a building's stud cavity. The bracket assembly 10 initially is as shown in FIG. 1A, with a main bracket or bracket body 12 coupled to a telescoping bracket 14, and with two clamps 16 and 18 staged in the main bracket 12. The clamps 16 and 18 have pre-set fasteners 20, such as screws or bolts, which allow the clamps 16 and 18 to be quickly removed and installed.

Figure 2:
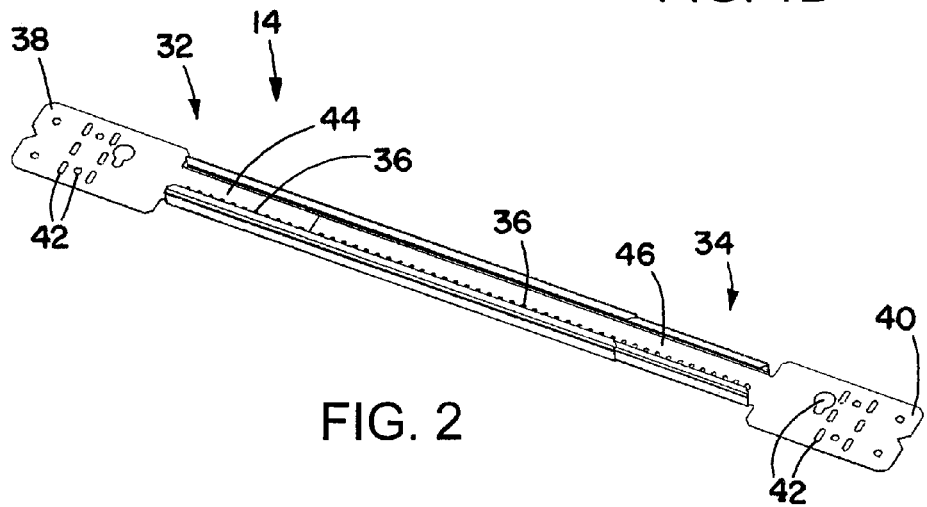
FIG. 2 is an oblique view of a telescoping bracket that is part of the bracket assembly of FIG. 1A.

The telescoping bracket 14 has a pair of telescoping elements 32 and 34. The telescoping elements 32 and 34 may be made of steel, and may be similar to the CADDY TSGB16 or TSGB24, available from ERICO International Corporation, of Solon, Ohio, USA. The telescoping elements 32 and 34 serve as a mid-span, allowing connection at either end of the mid-span to struts or other structure elements (or objects). FIG. 2 shows the two parts (the telescoping elements 32 and 34) that are able to slidingly engage one another, with one of the parts engaging folded-over rails along edges of the other of the parts. The elements 32 and 34 have lines of holes 36 for receiving one or more fasteners to secure the telescoping elements 32 and 34 in place to provide a desired length to the bracket 14. The telescoping elements 32 and 34 have respective end sections 38 and 40 that are bendable. The end sections 38 and 40 may have fastener holes 42 in them for receiving fasteners to mount the bracket assembly 10 to a wall, stud, or other structure. The fastener holes 42 may have a variety of shapes and/or sizes, for receiving any of a variety of different types of fasteners, such as nails, screws, rivets, etc. The end sections 38 and 40 may be maintained in the same plane as the narrow portions 44 and 46 of telescoping elements 32 and 34, or may be bent perpendicular to the narrow portions 44 and 46, as required for a given installation. The telescoping of the elements 32 and 34 may be used to change the length between the end sections 38 and 40, for example to accommodate different distances between studs or other elements to be connected to. The narrow portions 44 and 46 pass into a central slot 48 through the main bracket body 12 (see FIG. 1B). The central slot 48 may be an open slot, with an opening along a back side of the main bracket body 12, as shown in FIG. 1B. Alternatively, the central slot 48 may be an opening through the main body 12, bordered by a closed back of the body 12.

Returning now to FIG. 1A, a quick-release hose clamp 50 is pre-installed on the main body 12. The hose clamp 50 may be a steel hose clamp, and may be installed so as to be able to secure a circular object, such as a pipe, that is placed in a central depression 54 that is in the center of the main body 12. The hose clamp 50 may have a slotted strip 56 that has ends held together by a screw connection 58. When the hose clamp 50 is installed on the main body 12, the slotted strip 56 may be threaded through (passed through) openings in the main body 12. This maintains the hose clamp 50 physically connected to the main body 12, with part of the hose clamp 50 between the main bracket body 12 and the telescoping bracket 14. The screw of the screw connection 58 may be turned to tighten or loosen the hose clamp 50. Loosening the screw connection 58 enough will allow the ends of the strip 56 to separate, which may allow for removal of the strip 56 from the bracket main body 12.

A pair of screws 62 and 64 are at opposite ends of the main body 12, used for locking the main body 12 to the telescoping bracket 14. The screws 62 and 64 are pre-installed in corresponding holes in the body 12, and are screwed in to engage appropriate of the holes 36 (FIG. 2) in the telescoping elements 32 and 34, to lock the main bracket body 12 in place relative to the telescoping bracket 14.

Advantageously, all of the hardware necessary for use of the bracket 10 is contained on or in the main body 12 as shipped. The clamps 16 and 18, the fasteners 20 for use with the clamps 16 and 18, the hose 50, and the screws 62 and 64 used for locking down the plastic main bracket 12 to the steel telescoping bracket 14, are all pre-set. The main bracket 12 and the clamps 16 and 18 may be made of suitable plastic and the telescoping bracket 14 made be of steel, but other materials could achieve the same performance and/or other advantages. For example, rubber (or other sound absorbing materials) saddles could be installed on the brackets to help with sound attenuation.

The main bracket 12 has a front ridge 72 and a back ridge 74 on opposite sides of a recessed central portion 76. The central portion 76 has a flat, upward-facing top surface 78 in which are the holes for receiving the fasteners 20 for the clamps 16 and 18, and for receiving the screws 62 and 64. The holes may be undersized through holes to allow self-taping screws to generate threads as they are twisted in. The ridges 72 and 74 rise above the level of the central portion, and have a series of undulations 80 for receiving in them circular objects, such as pipe runs. The undulations 80 of the front ridge 72 may correspond in shape and position with those of the back ridge 74, so as to support pipe runs running parallel to one another, and perpendicular to the ridges 72 and 74. The pipe runs supported by the undulations 80 are also parallel to a pipe or other object placed in the central depression 54 in the main body 12. The undulations 80 may be V-shaped or U-shaped (or another suitable shape defining object-receiving depressions), and may form a repeating pattern along the top surfaces of each of the ridges 72 and 74. For example the undulations 80 may form three evenly-spaced depressions (or notches or grooves) 84 on opposite sides of the center of main body 12 (on either side of the central depression 54), for each of the ridges 72 and 74. Alternatively the ridges 72 and 74 may have any of a wide variety of sizes, shapes, and layouts of uneven surfaces, to form pockets or depressions for receiving objects, such as round cross-section objects like pipe runs.

The ridges 72 and/or 74 may have informational indicators 90 on their faces, for providing information to installers to aid in locating the bracket 10 relative to pipe runs. For example, the faces of the ridges 72 and 74 may have indicators at the depressions produced by the undulations 80 in the ridges that provide information of the distance between the center of the main bracket body 12 and the depressions for receiving objects. The indicators 90 may be numbers corresponding to the distances, or alternatively may be any of a variety of alphanumeric, symbols, or other visual indicators, providing this information or other information.

Ends 92 and 94 of the main body 12, where the screws 62 and 64 are located, may be elevated above the level of the central portion top surface 78. The ridges 72 and 74 may extend along and bend around the ends 92 and 94. The extensions may be curved or made up of straight (flat) sections.

Figure 3:
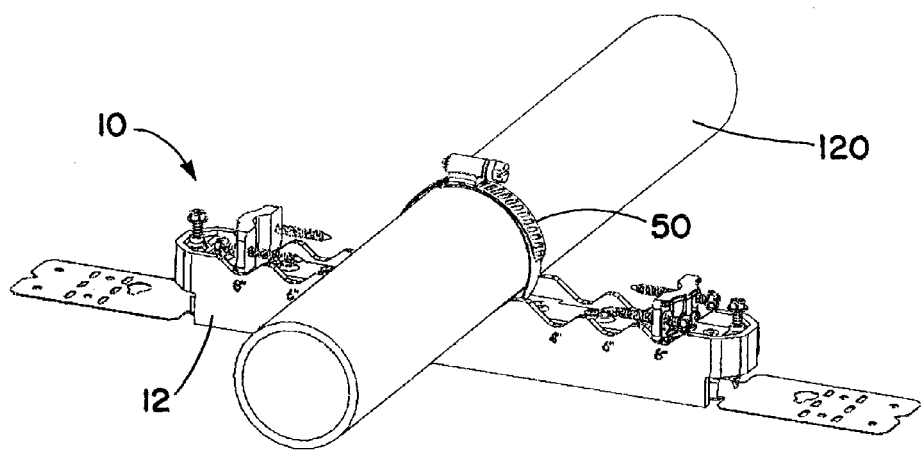
FIG. 3 is an oblique view showing a first step of use of the bracket assembly of FIG. 1A in an installation.
Figure 4:
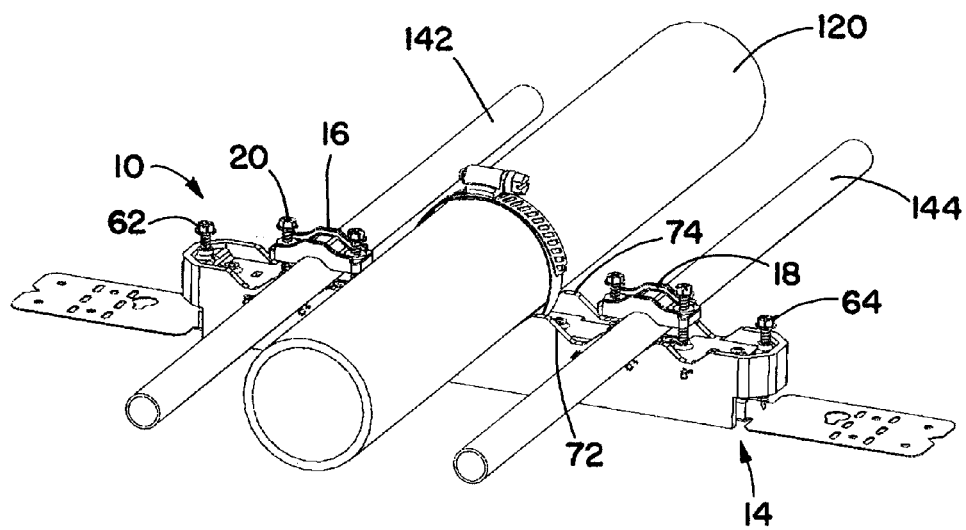
FIG. 4 is an oblique view showing a second step of the installation.
Figure 5:
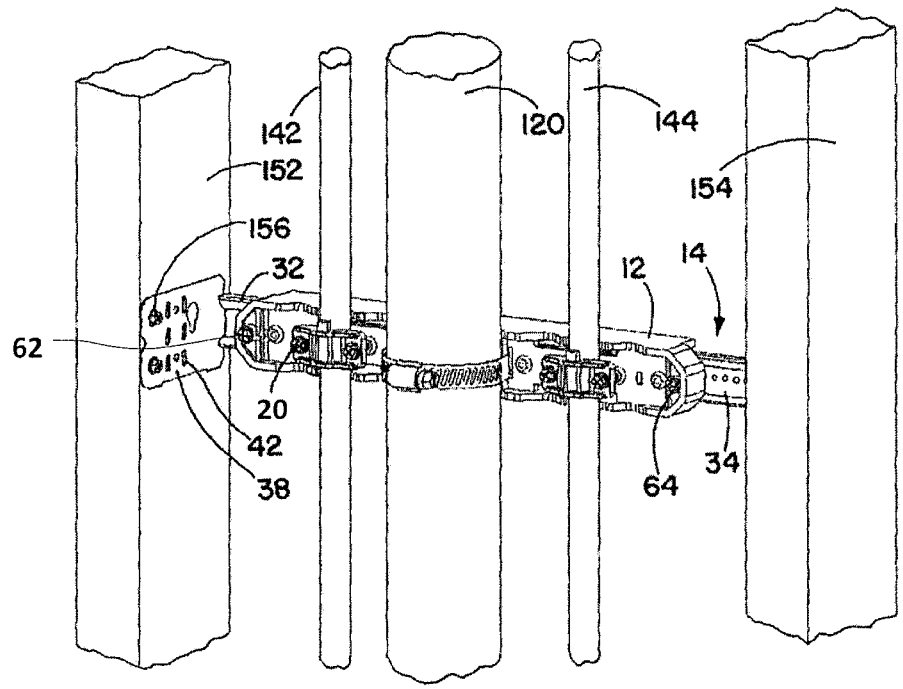
FIG. 5 is an oblique view showing a third step of the installation.

FIGS. 3-5 illustrate steps in an installation using the bracket assembly 10. The contractor will first install a waste pipe 120 (FIG. 3) by loosening the hose clamp 50, inserting the waste pipe 120, and finally tightening the hose clamp 50 around the waste pipe 120 to secure the assembly. Then, in FIG. 4, the supply lines 142 and 144 are installed by inserting the pipes 142 and 144 into the desired offset grooves in the ridges 72 and 74, removing the clamps 16 and 18, and driving the clamp fasteners (e.g., turning the screws) 20 down until the pipes are secured. FIG. 5 shows the finished installed state of the plumbing bracket 10. Note the end screws (lock screws) 62 and 64 are driven down in this step to fix the main bracket 12 to the telescoping bracket 14, once the location of the main bracket 12 is determined. The end sections 38 and 40 of the telescoping elements 32 and 34 have been bent, and secured to studs 152 and 154 using fasteners such as screws 156, which pass through suitable of the fastener holes 42 in the end sections 38 and 40

Possible advantages/features of the bracket assembly 10 include (in addition to those discussed above): the bracket assembly 10 has a mid-span support built in; the clamps are pre-assembled and staged into the side of the bracket for easy removal; the built-in mid-span support telescopes out to accommodate the various widths of stud spacing; it is faster to install supply and waste pipes using the bracket assembly, than using prior devices; pipe locations on the bracket and clamps (e.g., notches or grooves in the bracket) are in the shape of a "V," so multiple diameters of pipe can be accommodated; the bracket is designed to space the supply pipes at 10 cm (4 inches), 15 cm (6 inches), or 20 cm (8 inches away) from the center of the main body 12 (to give non-limiting examples of spacings); the bracket can slide independently of the mid-span support to allow for proper orientation and/or positioning, before locking the bracket to the mid-span down; and the bracket assembly can hold supply pipes and waste pipe together and to the building studs (or other structure/objects).

Many variations to the above-described bracket assembly. In the bracket, the primary pipe location shapes is that of a "V." Alternates are shaped like a "U" or flat across the top. Clamps may have any of these shapes. Alternatively, the main bracket body and/or the clamps may be made of a suitable metal, instead of plastic. The clamps may be staged in tapered slots or holes within the bracket, as in the embodiment described above; alternatives to the tapered holes or slots are tethers, attachment the to central pipe clamp, integration as break-away pieces that are initially part of the main bracket, or staged in screw down locations. In the illustrated embodiment, the clamps use screws (or other threaded fasteners) to fasten them to the pre-fab bracket. Alternate methods to attach the clamps to the bracket would be with friction, teeth, bolt and nut, push-in fasteners and latches. In the illustrated embodiment the central pipe is held with a hose clamp. Alternates are for the central clamp include a zip tie, or a screw down clamp. As another alternative, rubber (or other sound attenuating material) cushions could be added on the V-shape surfaces to provide sound attenuation.

The primary material for the telescoping bracket is metal in the illustrated embodiment, but plastic could be used as an alternative. The mid-span support is telescoping, but an alternate would be to have a bracket that was sized to fit into a stud cavity and did not telescope. The mid-span support and pipe bracket are separate parts, but an alternate would be a mid-span support and pipe bracket that were the same part. The pipe bracket slides along the telescoping bracket for adjustment, but an alternative would be a pipe bracket that was fixed to the mid-span support bracket.

The bracket wraps around the mid-span support on 4 sides. Alternate methods would be a pipe bracket that sits on one, two, or three faces of the mid-span support. The bracket could also pass through the mid-span support.

The primary method to fix the location of the pre-fab bracket to the mid-span bracket is with screws. Alternates would be friction, latches, pins, dowels, teeth, taper pegs, keyways, bolt and nut, or snaps.

The primary method of longitudinal adjustment of the prefab bracket with respect to the mid-span support is the slide the bracket along the mid-span support. Alternatives would be to fully remove the bracket and relocate it or thread it back and forth along the mid-span support.

Figure 6:
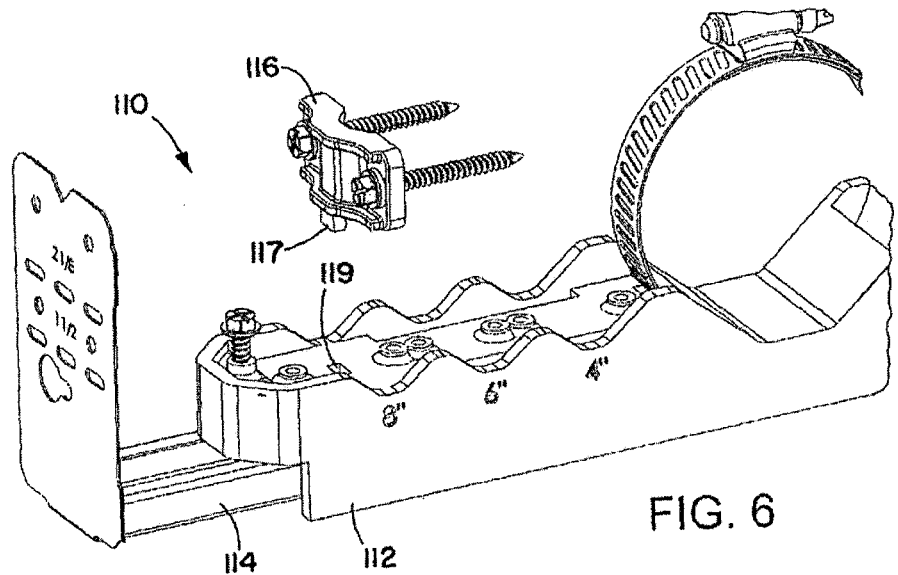
FIG. 6 is an oblique exploded view showing part of an alternate embodiment bracket assembly.

FIG. 6 shows an alternate embodiment, a bracket assembly 110 which has a clamp 116 that uses a rectangular protrusion 117 to engage a corresponding hole 119 in a main bracket body 112, such as by being pressed into the hole 119, with friction preventing the clamp 116 from accidentally being removed from the bracket body 112. The engagement may aid in keeping the clamp 116 secured to the bracket body 112 before use. The protrusion 117 and the hole 119 may have any of a variety of suitable sizes and/or shapes. The clamp 116 may be one of a series of clamps that are part of the bracket assembly 110. Other parts of the bracket assembly 110, such as a telescoping bracket 114, may be similar to those of the bracket assembly 10 (FIG. 1A).

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A plumbing bracket assembly configured to secure pipe runs to a structure, the plumbing bracket assembly comprising:
    a bracket body with a plurality of depressions configured to support a plurality of the pipe runs;
    hardware configured to secure at least one pipe run of the plurality of pipe runs to the bracket body; and
    a telescoping bracket configured to secure the bracket body to the structure, the telescoping bracket being mechanically coupled to the bracket body, and including a first telescoping element slidably nested within a second telescoping element;
    wherein the bracket body includes a first ridge and a second ridge separated by a central portion of the bracket body; wherein the first ridge includes a first slot and the second ridge includes a second slot to receive the hardware and secure the hardware to the bracket body with the hardware in a first orientation; and
    wherein, with the hardware removed from the first slot and the second slot and disposed in a second orientation, the hardware is configured to connect to the central portion to secure the at least one pipe run to the bracket.

2. The plumbing bracket assembly of claim 1, wherein the bracket body is made of plastic.

3. The plumbing bracket assembly of claim 1, wherein the bracket body has a central depression configured to receive a first pipe run of the plurality of pipe runs.

4. The plumbing bracket assembly of claim 3, wherein the bracket body has additional depressions configured to receive additional pipe runs of the plurality of pipe runs pipes, each of the additional depressions being smaller than the central depression.

5. The plumbing bracket assembly of claim 4, wherein the bracket body has multiple of the additional depressions on each side of the central depression, enabling a relative spacing of the first and additional pipe runs pipes, as secured to the bracket body, to be varied.

6. The plumbing bracket assembly of claim 1, wherein the bracket body is independently slidable along the telescoping bracket.

7. The plumbing bracket assembly of claim 1, wherein the first telescoping element and the second telescoping element extend out of opposite respective ends out the bracket body.

8. The plumbing bracket assembly of claim 1, wherein the first end section and the second end section have holes for receiving fasteners to mount the telescoping bracket to the structure.

9. The plumbing bracket assembly of claim 1, further comprising fasteners in the bracket body that are configured to lock the telescoping bracket in place relative to the bracket body.

10. The plumbing bracket assembly of claim 1, wherein the hardware includes a central hose clamp that fits through part of the bracket body.

11. The plumbing bracket assembly of claim 1, wherein the hardware includes at least one pipe clamp.

12. A plumbing bracket assembly configured to support pipe runs relative to a structure, the pipe runs including a first pipe run and a plurality of second pipe runs, with each of the plurality of second pipe runs having a smaller diameter than the first pipe run, the plumbing bracket assembly comprising:

a plastic bracket body configured to support the pipe runs, the plastic bracket body including a slot extending along a length of the plastic bracket body;

hardware configured to secure the pipe runs to the plastic bracket body; and a telescoping bracket configured to secure the plastic bracket body to the structure, the telescoping bracket including a first bracket element and a second bracket element that are slidably nested together and slidable relative to one another to change a length of the telescoping bracket, the first bracket element and second bracket element being inserted into the slot to slidably couple the telescoping bracket to the plastic bracket body;

the bracket body defining a central depression configured to receive the first pipe run, with a hose clamp mechanically coupled to the bracket body and configured to secure the first pipe run in the central depression;

the bracket body defining additional depressions smaller than the central depression, on either side of the central depression configured to receive the plurality of second pipe runs;

the first bracket element including a first bendable portion and the second bracket element including a second bendable portion, the first bendable portion and the second bendable portion each including fastener holes to secure the plumbing bracket assembly to the structure.

13. A plumbing bracket assembly for securing pipe runs to a structure, the plumbing bracket assembly comprising:

a bracket body with a plurality of depressions configured to support a plurality of the pipe runs;

hardware configured to secure at least one pipe run of the plurality of pipe runs to the bracket body; and a telescoping bracket configured to secure the bracket body to the structure, the telescoping bracket being mechanically coupled to the bracket body, and including a first telescoping element slidably nested within a second telescoping element;

a central portion of the bracket body including a first hole and a set of second holes;

a protrusion on the hardware being configured to engage the first hole to secure the hardware to the central portion with the hardware in a first orientation; and the hardware being configured, with the protrusion removed from the first hole and the hardware in a second orientation, to engage the set of second holes to secure the at least one pipe run to the bracket.

14. The plumbing bracket assembly of claim 1, wherein the bracket body is configured to support supports the plurality of the pipe runs on a first side of the bracket body, and includes a slot on a second side of the bracket body; and wherein the first telescoping element and second telescoping element are disposed within the slot on the second side of the bracket body to slidably couple the telescoping bracket to the bracket body.

15. The plumbing bracket assembly of claim 13, wherein the first telescoping element includes a first end section configured to bend relative to other parts of the first telescoping element to mount the telescoping bracket to the structure; and wherein the second telescoping element includes a second end section configured to bend relative to other parts of the second telescoping element to mount the telescoping bracket to the structure.

* * * * *